UNITED STATES PATENT OFFICE.

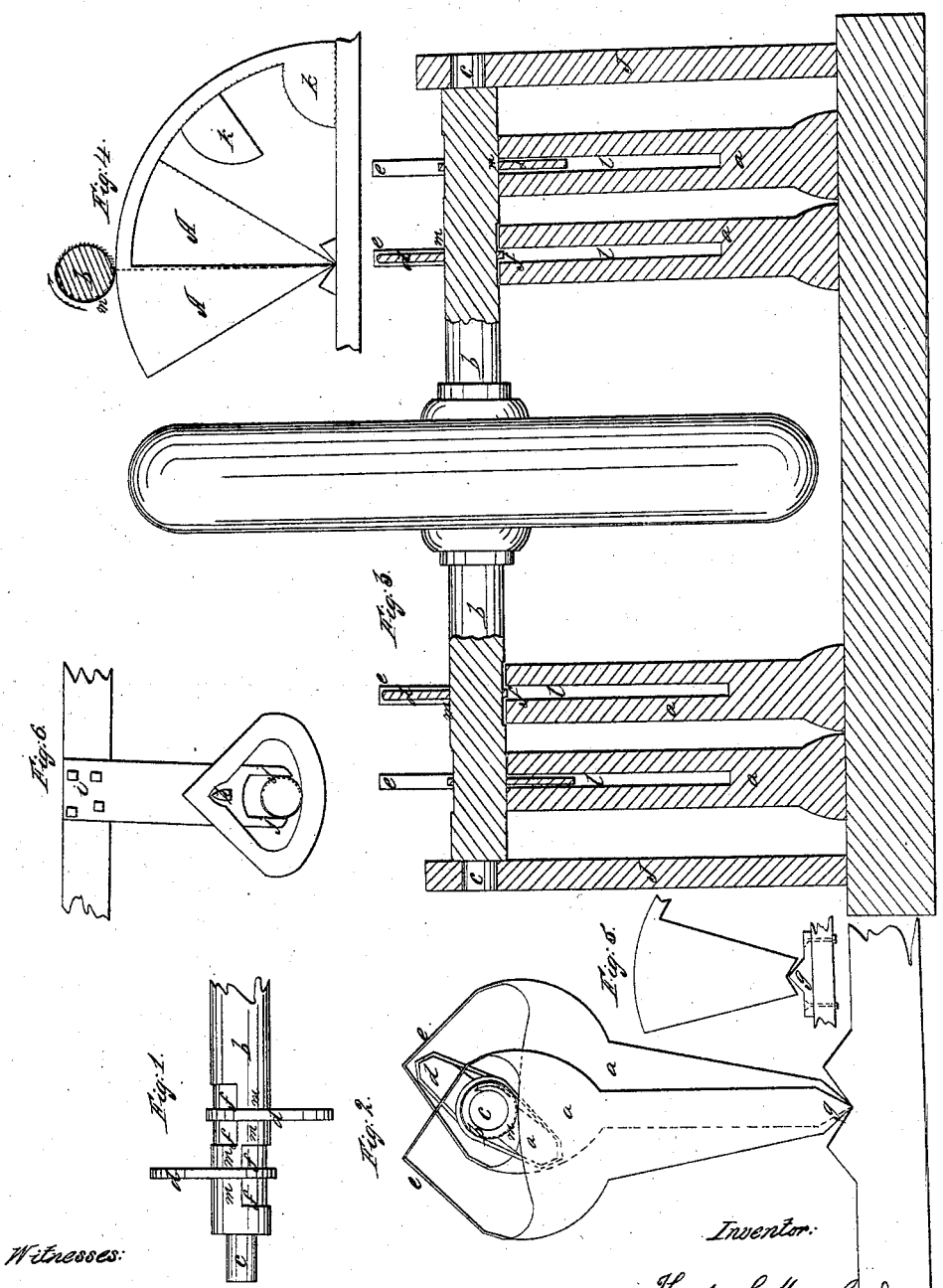

THEO. S. MINNISS AND THOS. S. MINNISS, OF MEADVILLE, PENNSYLVANIA.

PREVENTING FRICTION ON AXLES.

Specification of Letters Patent No. 22,971, dated February 15, 1859.

*To all whom it may concern:*

Be it known that we, THEODORE S. MINNISS and THOS. S. MINNISS, of Meadville, in the county of Crawford and State of Pennsylvania, have invented a new and Improved Method or Device for Avoiding Friction on Shaftings, Axles, and other Revolving Bodies; and we do hereby declare that the following is a full, clear, and exact description of the construction, arrangement, and operation of the same, reference being had to the annexed drawings, making a part of this specification, in which—

Figure 1 is a view of one end of a shaft. Fig. 2 is a side view of 2 sectors $a$, $a$, with an end view of shaft $b$ with the adjusters $d$, $d$. Fig. 3 is vertical section of the model. Fig. 4 represents the sectors where the shaft runs in one direction only. Fig. 5 shows the point of vibration inverted, and Fig. 6, both the sector and point of vibration inverted with the shaft bearing or hanging in an opening in the sector and having its movements on a concave surface instead of on the convex surface as in the other figures.

To enable others skilled in the art to make and use our invention, we will proceed to describe its construction and operation, like letters referring to like parts in the several figures, to wit:

Take a shaft or axle that has been smoothed off to parallel sides to a sufficient distance at each end from the journal $c$, Fig. 1. We then cut away to a slight depth (say ¼ in.) first on one side of the shaft as wide as bearing face of the sector that is to be used (see $f$, $f$, Figs. 1 and 3) said cut or depression not to go quite half way around the shaft. Then upon the opposite side of the shaft but enough farther along from ($c$) for the bearing of another sector we make another depression $f$, $f$, $f$, $f$ or if desired as on a wooden shaft instead of cutting away the shaft we will add a plate of the proper thickness bent around corresponding to the raised or bearing sides of the shaft. Having thus prepared the shaft at both ends, we make our sectors of any length required in all cases having the distance from the point of vibration $g$ to the shaft $b$ to be the exact length of the radius that describes the bearing arc, and the arc of the sector must always be in length equal to the bearing portion of the shaft that rolls upon it. The two plain sectors with their weighted arms A A in Fig. 4 are placed with their points $g$, $g$, in a recess or gutter in a perpendicular line beneath the center of the shaft $b$ and the shaft being held in position laterally by the stays $j$ $j$ as seen at $c$, $c$, Fig. 3, if the shaft is now started in the direction of the arrow, the bearing surface of the shaft indicated by the dotted periphery will at once roll onto the right hand sector and the friction of their surfaces will cause the dotted weighted arm $k$ to raise and as soon as the bearing surfaces of the left-hand sector and shaft have parted contact the weighted arm will at once bring it into the position of the now dotted sector the surface of the sector having slipped through the recess $f$, $f$, while the dotted sector is being drawn up to be dropped in like manner and so on alternately till the shaft is stopped. We make the bearing surfaces on the shaft to reach a little more than half around so that one sector may be fairly started before the other is relieved and to prevent the entire weight of the shaft bearing at any time on the sharp edge of the recess $f$ $f$.

Where the revolution of the axle or shaft is required to move in either direction as on a rail road car or shafting in steamboat or machine ship, we construct our shafts or axles with adjusters $d$, $d$, or projections extending from the middle of each bearing surface on the shaft with a corresponding slot in the bearing surface of the sector $l$ (see Fig. 3) for said adjusters to play through. The sectors are also formed with a curve at each end of their bearing surfaces to prevent the axle in any event from rolling off, and from the points of the curves or lips a thin strap of some suitable metal or other material continues till it meets at a point on a vertical line passing through the middle of the sector and as far above the bearing surface of the sector as said bearing surface is long—*i. e.*, a little more than half the circumference of the shaft. Now, starting the shaft $b$ in Fig. 2 in the direction of the arrow, the bearing surface of the shaft being in contact with the left-hand sector, will cause it to vibrate to the right, while the adjuster $a$, as indicated by the dotted lines, will pass freely through its slot $l$, while the straps $e$ $e$ being directly over the slots $l$, $l$, the upper adjuster $d$ will strike its strap and force back the sector to be in position to receive the bearing face of the shaft and so alternately while the shaft is in motion. It will operate with equal facility in either direction and although more complicated than Fig. 4, will run lighter than the weighted sectors, as there will always be the compensating weight of one sector falling past the center of vibration to bring the other up to that point. Where a very quick motion is required we will draw a ring of india-rubber or other soft material around the shaft and over the points of the adjusters so as to deaden the noise made by the adjuster striking the cap or strap as well as sectors falling against the shaft. Where there will be a tendency for dirt, sand, or other grit to gather about the points of vibration $g, g$, as would be the case if placed in a running stream, we will in such case invert the points of vibration $g\ g$ as seen in Fig. 5, making the gutter or point of contact in the lower point of the sector. Where the shaft is to be upborne by hangers as in machine shops we will suspend a bar or plate (see $i$ Fig. 6) from the beam, said plate having stays $j\ j$ at its lower extremity, and on each side of the plate $i$ at the required height fix or cast a projection or point of vibration $h$ on which to hang an open sector by its inner angle, the shaft bearing on the concave surface of the arc this may be used either with or without adjusters as the bearing surface or arc may be so extended that less than half its length will suffice for the bearing surface of the shaft and after being swung up by traction will fall into position by gravity. With adjusters however but half the length of arc of sector is required as the same surface answers when running in either direction the adjusters in this case striking the inner sides of the sectors in lieu of the straps $e\ e$. When desired this same arrangement of hanging sectors may be used above the beam as well as below it, by erecting a suitable support on top the beam and hanging the sectors to the points on its upper extremity. This will no doubt be a desirable plan where it is necessary to apply the device to gudgeons already hung by the common method.

Our invention will apply to all kinds of lateral friction, no matter what the direction of the shaft, whether caused from vertical pressure or from horizontal or oblique strain of belts or other gearing, provided always that the center of the shaft, the points of contact of shaft and sectors, and the points of vibration $g\ g$ are in a line with the direction of the strain or pressure.

When applied to rail road cars the whole arrangement as seen in Fig. 3 will have to be inverted, the sectors bearing on the upper instead of the under side of the axle, in which case the points of vibration will have to be held in contact with their bearings either by ligaments through their points, or pivots on their sides, with suitable boxing to hold them in place said points of vibration being either angular or rounded, as may be deemed most important in the service required. But we will not further amplify on the application of our invention as any one skilled in such art will be competent to adapt it to his needs. The same principle however, will apply under upright shafts, turntables and the like by having alternate depressions and bearings on the end of the shaft or under side of turntables with sectors properly beveled and placed at proper distances underneath, being adjusted by either weights or springs. It will also apply in a straight line between sliding surfaces by having the sectors fixed to one surface and the alternate bearings and depressions on the other. Our invention in short is a shaft or other moving body so prepared with alternate bearings and depressions that in combination with sectors $a\ a$ and the stays $j\ j$ all friction will be taken from the moving surface in the direction of the points of vibration $g\ g$ of the sectors whether in a vertical, oblique or horizontal position allowing perfect freedom for the sectors to return through their recesses or depressions, after having sustained the moving body over its raised or bearing surfaces so as to be in position to again receive the weight when the bearing surface moves into contact—one sector doing duty while the other is falling back into position.

What we claim as our invention and desire to secure by Letters Patent is—

1. The employment of sectors to avoid friction on rolling or sliding surfaces substantially as set forth.

2. We also claim the combination of the shaft, sectors and their adjusters the whole being arranged constructed and operating substantially as described.

THEODORE S. MINNISS.
THOS. S. MINNISS.

Witnesses:
M. H. BAGLEY,
JAS. BURCHFIELD.